United States Patent [19]

Higaki et al.

[11] Patent Number: 5,708,861
[45] Date of Patent: Jan. 13, 1998

[54] CAMERA

[75] Inventors: Riichi Higaki, Kawasaki; Hiroyuki Tsuru, Tokyo, both of Japan

[73] Assignee: Nikon Corporation, Tokyo, Japan

[21] Appl. No.: 701,234

[22] Filed: Aug. 23, 1996

Related U.S. Application Data

[63] Continuation of Ser. No. 565,260, Nov. 30, 1995, abandoned, which is a continuation of Ser. No. 352,091, Nov. 30, 1994, abandoned.

[30] Foreign Application Priority Data

Dec. 1, 1993 [JP] Japan ............................ 5-301719

[51] Int. Cl.[6] .................................................. G03B 17/00
[52] U.S. Cl. ................................................ 396/48; 396/293
[58] Field of Search ............................ 396/48, 281, 293, 396/287

[56] References Cited

U.S. PATENT DOCUMENTS 5,235,380 8/1993 Yamada et al. ........................ 354/471

Primary Examiner—W. B. Perkey

[57] ABSTRACT

Disclosed is a camera comprising a plurality of controlled devices each operated in at least one of a photographing action and a photographing standby action, the photographing standby action having a first photographing standby action and a second photographing standby action, a release device having a first stroke of outputting a first signal for indicating an execution of the photographing standby action and a second stroke of outputting a second signal for indicating an execution of the photographing action and a control device for repeatedly executing a part of the second photographing standby action through a part of the controlled devices during the outputting of the first signal, repeatedly executing the first photographing action till a predetermined time elapses or till the first signal is outputted when the first signal annihilates without outputting the second signal after the first signal has been outputted, starting an execution of the second photographing standby action when the first signal is outputted during the execution of the first photographing standby action and executing the photographing action by other part of said controlled devices when the second signal is outputted after executing at least other part of the second photographing standby action.

6 Claims, 7 Drawing Sheets

CAMERA

This application is a continuation of application Ser. No. 08/565,260, filed Nov. 30, 1995, now abandoned, which application Ser. No. 08/565,260 was a continuation of application Ser. No. 08/352,091, filed Nov. 30, 1994, now abandoned.

BACKGROUND OF THE INVENTION

1. Field of the Invention

The present invention relates to a camera for performing a photographing standby action in response to a first signal transmitted from a release device and performing a photographing action in response to a second signal.

2. Related Background Art

This type of camera comprises a release button having a first stroke and a second stroke, a half-push switch turned ON by the first stroke operation of the release button to output a first signal and a full-push switch turned ON by the second stroke operation of the release button to output a second signal. When the first signal is outputted, the photographing standby action which is to be done in advance of the photographing action is executed. When the second signal is outputted, the photographing action is executed after finishing the photographing standby action. The photographing standby action includes a photometric action of determining an exposure stop value and a shutter speed by measuring a luminance of an object. The photographing standby action also includes a distance measuring action of measuring a distance to the object by use of a distance measuring device and an action of displaying a variety of these measured and calculated results on an in-finder display device or the like.

Further, it is known that some of the cameras described above are equipped with a so-called half-push timer. The half-push timer is constructed in the following way. The photographing standby action is classified into a first photographing standby action (standby action) and a second photographing standby action other than the former action, wherein the first photographing standby action entails a photometric action by a photometric device, an action of calculating the exposure stop value and the shutter speed from the photometric result and an action of displaying the arithmetic result on a display device. After the first signal is outputted with the first stroke operation of the release button, the standby actions are sequentially repeatedly performed until the first signal is again inputted or until a given time elapses when the inputting of the first signal disappears without outputting the second signal with the second stroke operation. When the first signal is again inputted, the operation shifts to the second photographing standby action.

In the conventional camera equipped with the above-mentioned half-push timer, however, a presence or non-presence of the first signal is determined after finishing a series of standby actions by the photometric device or the like. When the first signal is not outputted, the series of standby actions are again repeatedly executed. Hence, even when the first signal is outputted during the standby action, the second photographing standby action is inexecutable until the series of standby actions are once finished. There is a large time lag until the operation shifts to the second photographing standby action. This probably influences the operability. Particularly when the camera has an indicator for indicating the arithmetic result by mechanically driving a pointer thereof, a response of the indicator is relatively late, and, therefore, the time lag increases due to a wait for the start of the second photographing standby action until the standby action is finished.

SUMMARY OF THE INVENTION

It is a primary object of the present invention to provide a camera capable of shifting the operation to a second photographing standby action after a first photographing standby action has been quickly finished upon outputting a first signal.

Referring to the accompanying drawings, a camera according to the present invention comprises a plurality of controlled devices (1, 13, 18, 19, 20, 21, 22, 25) each operated in at least one of a photographing action (S150–S152) and a photographing standby action (S101–S149), the photographing standby action having a first photographing standby action (S105–S111) and second photographing standby action (S112–S149). The camera also comprises a release device (2, 11) having a first stroke (S1) of outputting a first signal for indicating an execution of the photographing standby action and a second stroke (S2) of outputting a second signal for indicating an execution of the photographing action. The camera further comprises a control device (3, 10) for repeatedly executing a part (S145–S149) of the second photographing standby action (S112–S149) through a part (19, 23, 24, 25) of the controlled devices during the outputting of the first signal, repeatedly executing the first photographing action (S105–S111) until a predetermined time elapses (S105) or until the first signal is outputted (S111) when the first signal annihilates without outputting the second signal after the first signal has been outputted, starting an execution of the second photographing standby action when the first signal is outputted (S111) during the execution of the first photographing standby action and executing the photographing action (S150–S152) by other part (20, 21, 22) of the controlled devices when the second signal is outputted (S143, S149) after executing at least other part (S112–S142) of the second photographing standby action (S112–S149).

The first photographing standby action (S105–S111) contains at least a first action (S202) and a second action (S214) executed in sequence and also a determining action (S111) of determining whether or not the first signal is outputted from the release device (2, 11).

The controlling device (3, 10) determines whether or not the first signal is outputted (S204, S207, S210, S213) from the release device (2, 11) between the first action (S202) and the second action (S214) and starts, when determining that the first signal is outputted, the second photographing standby action (S112–S149) by skipping over the second action.

Herein, the second action (S214) preferably include such an action (S214) that an indicator (25) indicates the data by mechanically driving the pointer thereof.

The controlling device 3, even after the first action has been finished, determines whether or not the first signal is outputted from the release device 2 and immediately starts, when determining that the first signal is outputted, the second photographing standby action. Accordingly, the second photographing standby action can be executed without implementing the second action. The response until the operation shifts to the second photographing standby action, can be made quicker by a time needed for executing the second action than in the case where the first and second actions are sequentially implemented as done in the prior art.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Figure 1:
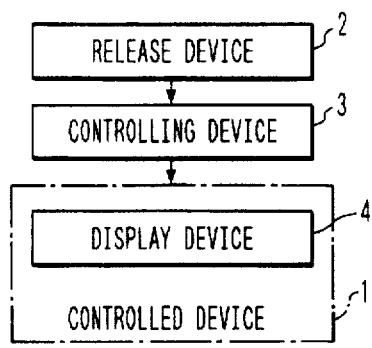
FIG. 1 is a view schematically illustrating a construction of the present invention.
Figure 2:
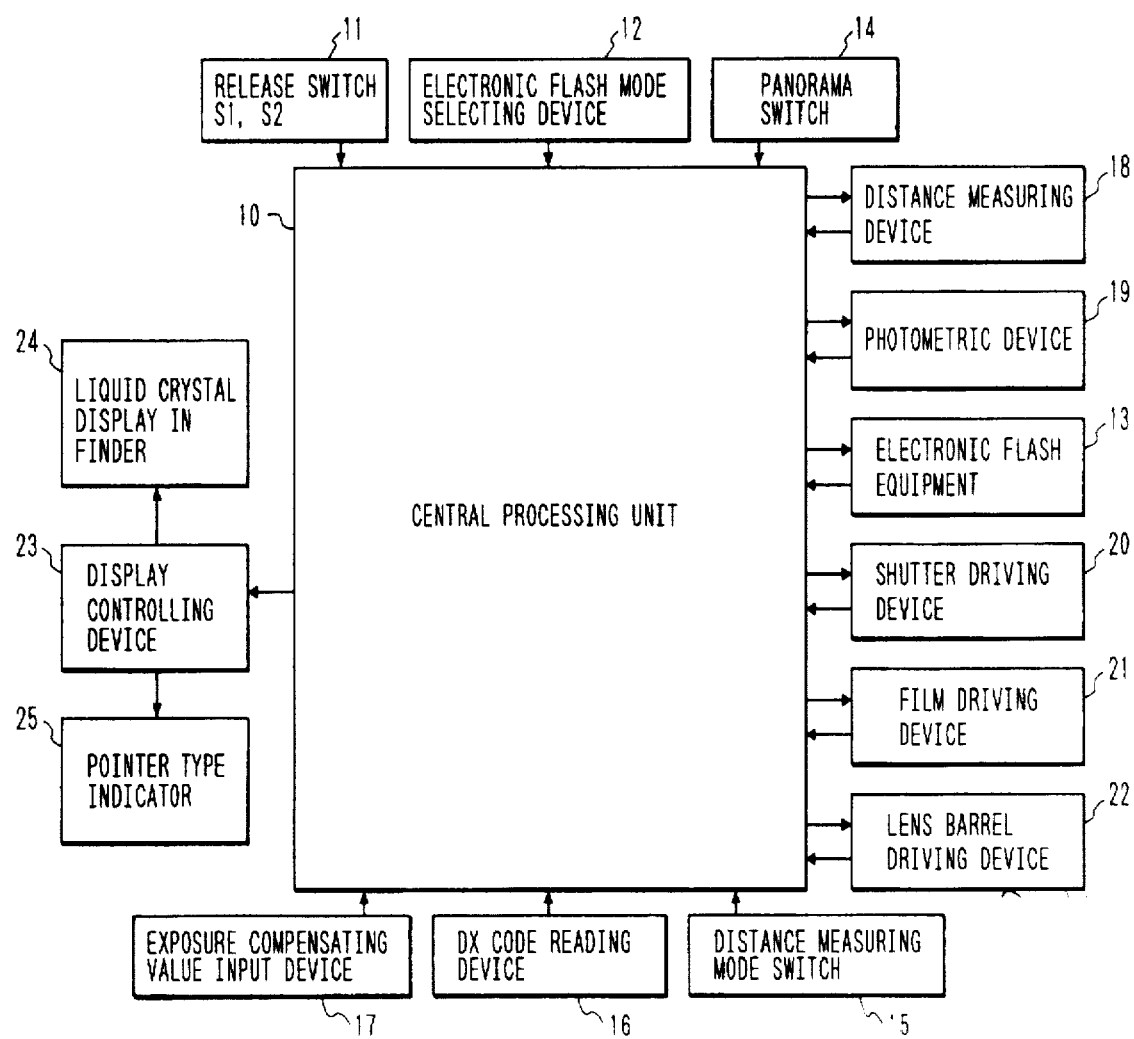
FIG. 2 is a block diagram showing a construction of a camera in an embodiment of the present invention.
Figure 3:
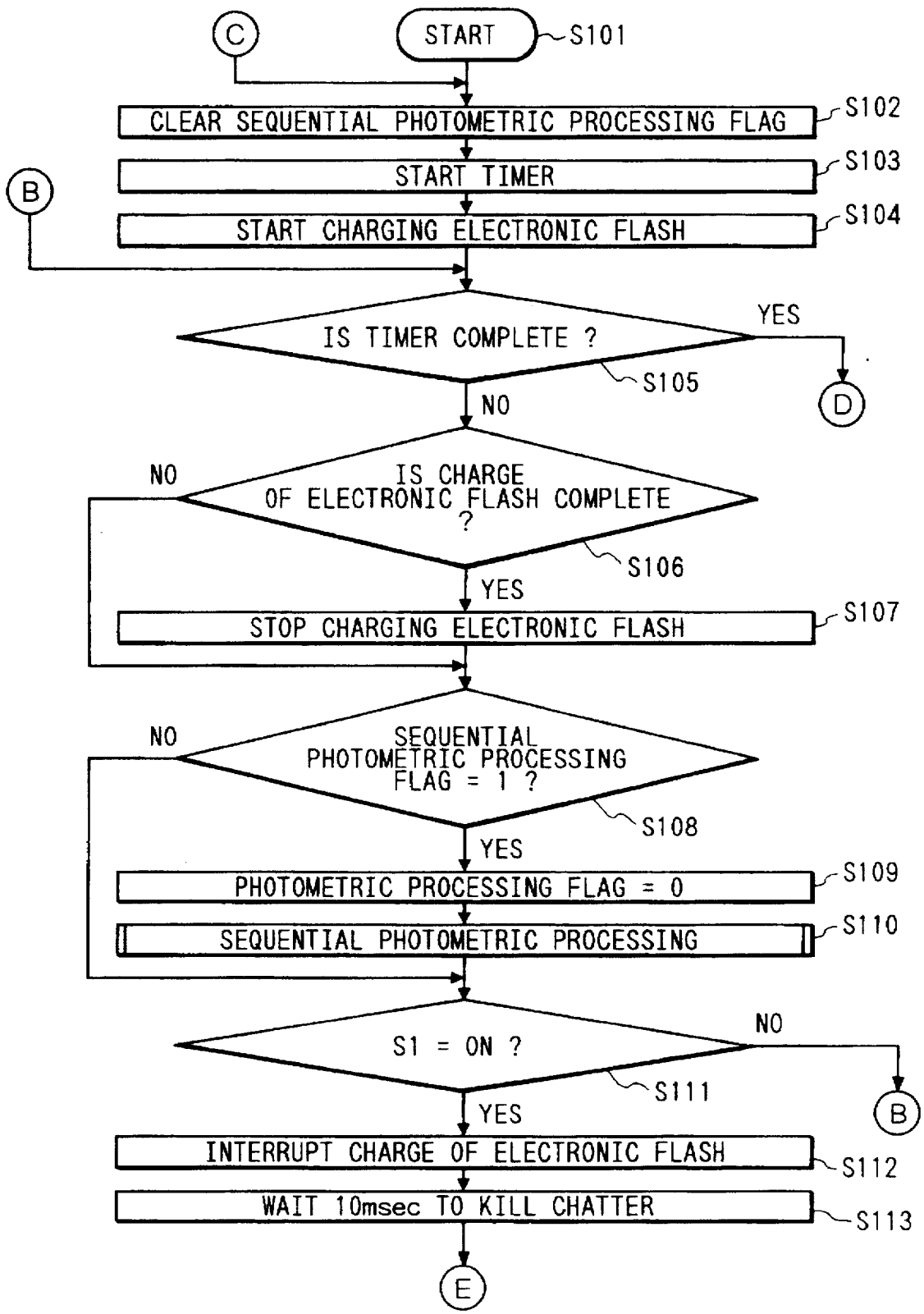
FIG. 3 is a flowchart of assistance in explaining the operation of the camera in the embodiment of the present invention.
Figure 4:
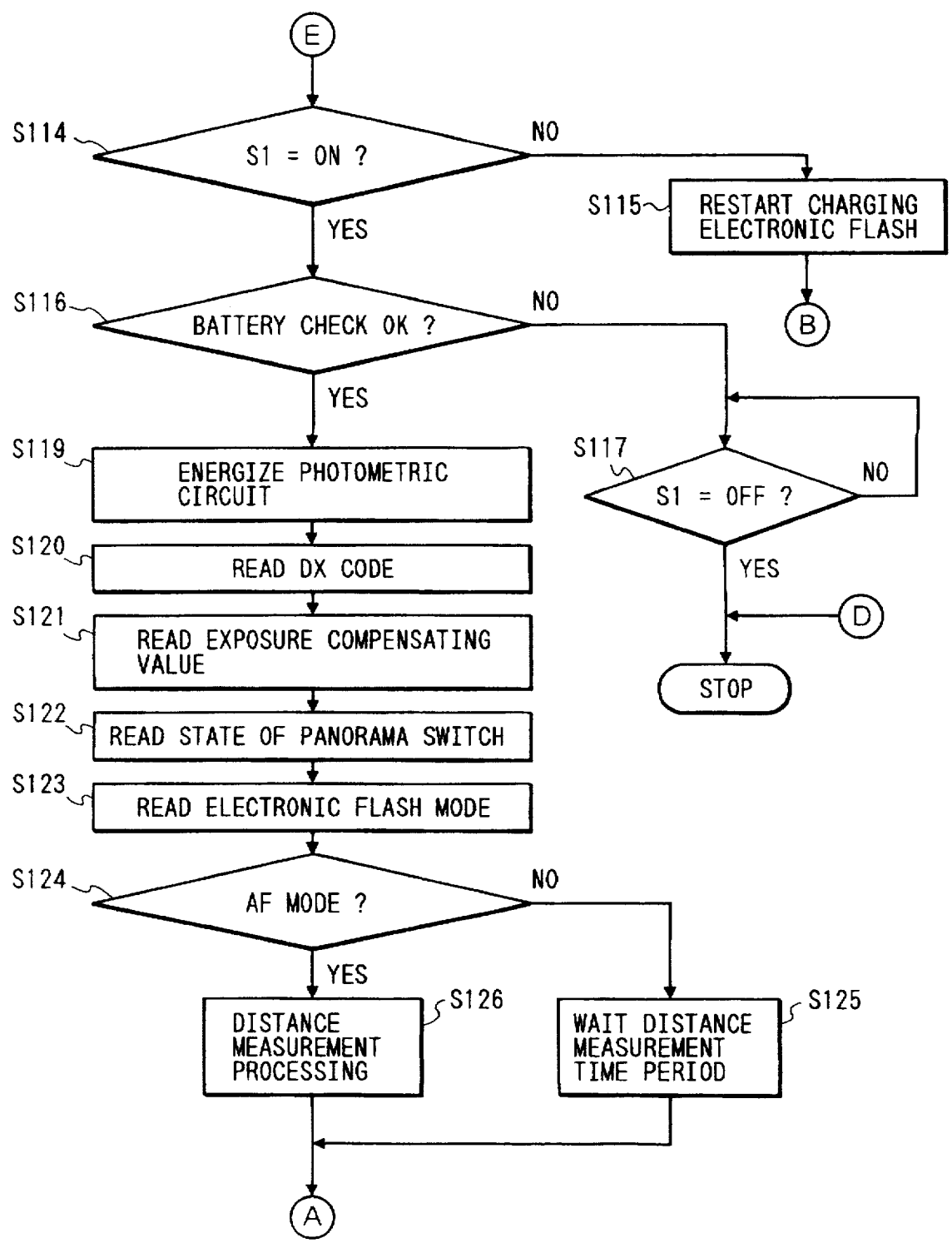
FIG. 4 is a flowchart continued from FIG. 3.

FIG. 2 is a block diagram schematically illustrating a construction of a camera in one embodiment of the present invention. Referring to FIG. 2, a central processing unit (hereinafter abbreviated to CPU) 10 is equipped with an arithmetic processing element, a memory element and an interface element. This CPU 10 controls the operation of the whole camera.

A release switch 11 is turned ON (S1=ON) with a first stroke operation (hereinafter referred to as a half-push in some cases) of an unillustrated release button, thereby outputting a first signal (half-push signal). The release switch 11 is also turned ON (S2=ON) with a second stroke operation (hereinafter termed a full-push in some cases) of the release button, thereby outputting a second signal (full-push signal). The first and second signals from the release switch 11 are respectively inputted to the CPU 10. When the first signal is inputted to the CPU 10, this CPU 10 executes a predetermined photographing standby action. When the second signal is inputted to the CPU 10, the CPU 10 executes a predetermined photographing action. Further, if the inputting of the first signal is stopped without inputting the second signal after the first signal has been inputted, the CPU 10 executes a standby action until a predetermined time elapses or until the first signal is inputted. The photographing standby action, the photographing action and the standby action will be hereinbelow described in greater detail.

An electronic flash mode selecting device 12 outputs such signals that electronic flash modes indicate set-by-photographer results. These electronic flash modes are an auto flash mode of automatically flashing an electronic flash equipment 1 (which will be mentioned later) in accordance with a luminance of an object, a forcible flash mode of forcibly flashing the electronic flash equipment 13, a flash inhibit mode of inhibiting the flash of the electronic flash equipment 13 and a pink-eye effect reduction mode of reducing a pink-eye effect produced by the electronic flash equipment 13. A panorama switching device 14 outputs a signal indicating which mode, a panoramic photographing mode or a normal photographing mode, the photographer sets. A distance measuring mode switching device 15 outputs a set-by-photographer result with respect to distance measuring modes such as an autofocus mode, a forcible infinite mode and a manual photographing distance set mode. A DX code reading device 16 reads DX codes indicated on an unillustrated film patrone and outputs film data. An exposure compensating value input device 17 outputs a signal indicating an exposure compensation quantity with respect to an auto exposure quantity set by the photographer. Signals outputted from these devices described above are inputted to the CPU 10. These devices function as input devices to the CPU 10.

A distance measuring device 18 is controlled by the CPU 10 but measures a distance to an object and transmits an item of distance data to the CPU 10. A photometric device 19 is controlled by the CPU 10 but measures a luminance of the surface of a photographed picture and transmits an item of luminance data to the CPU 10. An electronic flash equipment 13 is controlled in terms of its flashing and thus supplies the object with an artificial illumination. A shutter driving device 20 drives an unillustrated exposure stop and a shutter blade in accordance with an exposure stop value and a shutter speed that are calculated by the CPU 10 on the basis of the photometric result of the photometric device 19. A film driving device 21 controlled by the CPU 10 automatically winds up an unillustrated film for a first frame when loading the film and also winds up the film for one frame per shot. The film driving device 21, when finishing the photographing up to the terminal of the film, automatically rewinds the film. A lens barrel driving device 22 extends an unillustrated photographing lens up to a position calculated by the CPU 10 on the basis of a result of the distance measurement by the distance measuring device 18.

A display control device 23 causes an in-finder liquid crystal display device 24 and a pointer type indicator 25 to display the data inputted from a variety of input devices described above and measured results given by the above photometric device 19, etc. in accordance with an instruction of the CPU 10.

Next, the operation of the camera in this embodiment will be explained with reference to flowcharts of FIGS. 3 to 8. FIGS. 3 to 6 are flowcharts of assistance in explaining a main routine of the camera operation in accordance with this embodiment.

The main routine shown in FIGS. 3 to 6 starts with the half-push of the release button after the camera has been powered ON by turning ON an unillustrated power switch (step S101).

First, a sequential photometric processing flag is set to 0 in step S102. The sequential photometric processing flag indicates that the sequential photometric processing (to perform, as will be mentioned later, the photometry at intervals of 0.5 sec. in this embodiment) is set in the standby action when this flag is 1. Next in step S103, a power-save timer built in the CPU 10 is started. In step S104, a charging signal is transmitted to the electronic flash equipment 13 to start the charge of the electronic flash equipment 13. Thereafter, in step S105, whether the half-push timer is finished is determined. If the determination is affirmative, the program shifts to step S106. Whereas if negative, all the processing is stopped. The half-push timer, if there is, as stated above, no full-push action subsequent to the half-push action, and when the half-push action is canceled, waits for the half-push action for a predetermined time (e.g., 20 sec. in this embodiment) and, thereafter, serves to finish the operation of the camera.

In step S106, whether a charge completion signal is outputted from the electronic flash equipment is determined. If the answer is YES, the program goes forward to step S107, wherein the charging of the electronic flash equipment 13 is stopped by stopping the transmission of the charging signal to the electronic flash equipment 13. Whereas if the answer is NO, the program moves forward directly to step S108. In step S108, a value of the above-mentioned sequential photometric processing flag is determined. As a result, if the value of the sequential photometric processing flag is 1, the program goes forward to step S109. If the value thereof is 0, the program skips to step S111.

In step S109, a photometric processing flag is set to 0. This photometric processing flag is a flag indicating that the processing of a sequential photometric processing step S145 which will be stated later is executed even if half-pushed when executing the sequential photometric processing step S145 in the case of this flag being 1. In step S110, the sequential photometric processing is carried out. The sequential photometric processing will be described later in greater detail.

In step S111, whether half-pushed (S1=ON) is determined. If the answer is YES, the program moves forward to step S112. Whereas if the answer is NO, the program goes back to step S105, in which the above operation is repeated. In step S112, when transmitting the charging signal to the electronic flash equipment 13, the charging of the electronic flash equipment 13 is temporarily interrupted by stopping the transmission thereof. In step S113, there is a 10-millisecond wait so as not to undergo chattering of the release switch 11. Whether half-pushed is again determined in step S114. AS a result, if the answer is YES, the program shifts to step S116. Whereas if the answer is NO, the program shifts to step S115, in which the transmission of the charging signal to the electronic flash equipment 13 resumes. Then, the program returns to step S105, wherein the above-stated operation is repeated.

In step S116, a voltage of the unillustrated battery built in the camera is A/D-converted and thus read by the CPU 10. The CPU 10 determines whether the battery has a voltage enough to execute the photographing action. If the determination is affirmative, the program shifts to step S119. Whereas if not, there is a wait till the half-push is canceled (S1=OFF) in step S117, and all the processing is stopped.

In step S119, a photometric circuit of a photometric device 19 is powered ON. In step S120, a DX code indicated on a film patrone is read by a DX code reading device 16. Read in step S121 is a set exposure compensating value set by an exposure compensating value input device 17. Read in step S122 is a mode set by a panorama switch 14. Read in step S123 is an electronic flash mode set by an electronic flash mode selecting device 12.

Read subsequently in step S124 is a distance measuring mode set by a distance measuring mode switch 15. Whether this distance measuring mode is an autofocus mode is determined. As a result, the answer is YES, the program goes forward to step S126, wherein a distance measuring device 18 measures a distance. An extension quantity of a photographing lens is calculated based on a result thereof, and, thereafter, the program moves forward to step S127. Whereas if the answer is NO, i.e., when the distance measuring mode is determined as a forcible infinite mode or a manual distance set mode, the program goes forward to step S125, in which there is a wait for a time required for measuring the distance in the autofocus mode. After this wait, the program moves forward to step S127. This waiting time is needed for stabilizing the operation of the photometric circuit powered ON in step S119. When the autofocus mode is set, the waiting time is, if the distance measuring mode other than the above-mentioned is set, prepared for stabilizing the operation of the photometric circuit within a time needed for executing the distance measuring processing in step S126.

Figure 5:
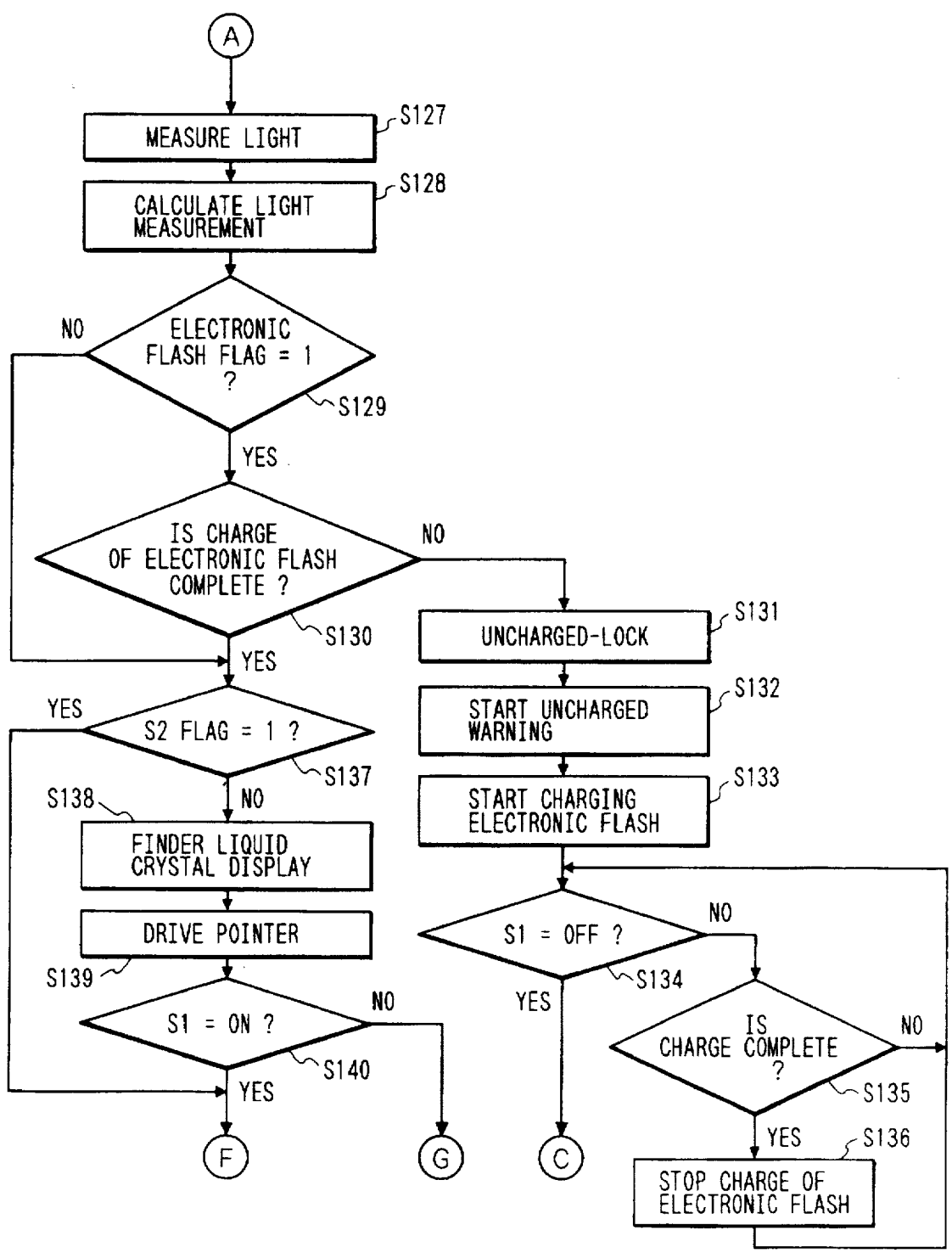
FIG. 5 is a flowchart continued from FIG. 4.
Figure 6:
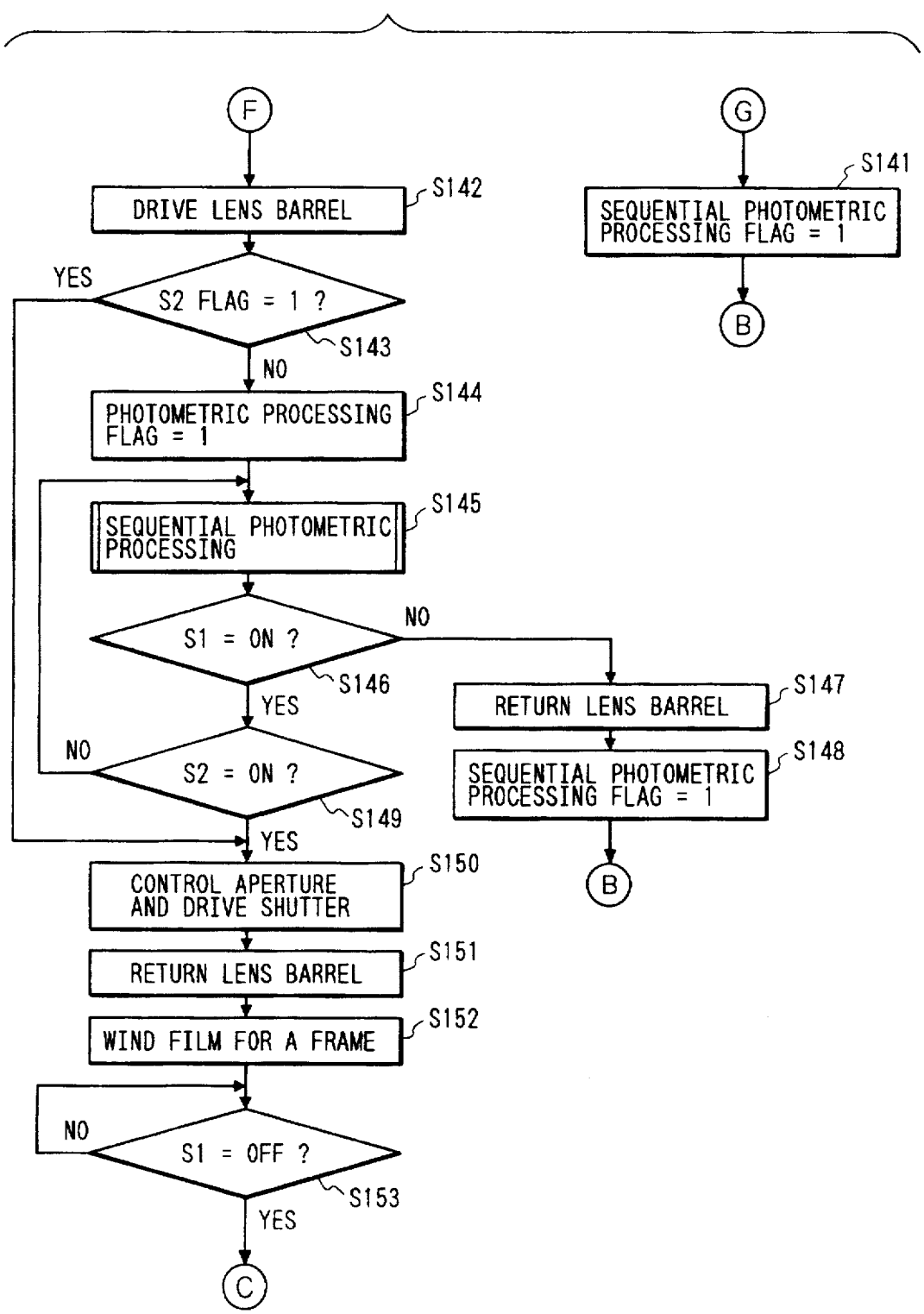
FIG. 6 is a flowchart continued from FIG. 5.

After stabilizing the operation of the photometric circuit in this way, the photometric device 19 performs the photometric processing in step S127 in FIG. 5. In step S128, an exposure stop value (AV calculation) and a shutter speed (TV calculation) are calculated by use of output values of the photometric device 19. Note that the distance measuring and photometric operations are known, and, hence, detailed explanations thereof will be omitted.

In step S129, whether an electronic flash flag is 1 is determined. The electronic flash flag becomes 1 when the electronic flash mode read in step S123 is the forcible flash mode, or when determining that the electronic flashing is needed from the photometric results given in steps S127, S128 described above. As a result of the determination made in step S129, if the answer is YES, the program goes to step S130. Whereas if the answer is NO, the program skips to step S137. In step S130, whether the charging of the electronic flash equipment 13 is completed is determined. If the determination is affirmative, the program moves to step S137. Whereas if not, the program goes to step S131.

In step S131, the subsequent photographing action is inhibited. In step S132, an in-finder liquid crystal display device 16 gives a warning saying that the charging is not yet done. In step S133, the charging of the electronic flash equipment 13 is started. Thereafter, in step S134, whether the half-push is canceled (S1=OFF) is determined. If the answer is YES, the program returns to step S102, wherein the processing is started from the beginning. Whereas if the answer is NO, the program goes to step S135 to determine whether the charge complete signal is outputted from the electronic flash equipment 13. As a result, if the answer is YES, the charging of the electronic flash equipment 13 is stopped, and the program goes back to step S134. Whereas if the answer is NO, the program returns to step S134.

On the other hand, whether the S2 flag is 1 is determined in step S137. The S2 flag becomes 1 when full-pushed (S2=ON) but is cleared to 0 when the photographing is finished. In consequence of this, if the answer is NO, the program shifts to step S138. Whereas if the answer is YES, the program skips to step S142 in FIG. 6. In step S138, the in-finder liquid crystal display device 24 displays items of photographing data of the distance measuring result, the exposure stop value and the shutter speed. In step S139, a pointer type indicator 25 also indicates the photographing data. Thereafter, in step S140, whether the half-push is effected (S1=ON) is determined. If the determination is affirmative, the program shifts to step S142. Whereas if not, the program moves to step S141 wherein the sequential photometric processing flag is set to 1, and the program returns to step S105.

A lens barrel driving device 22 is driven in step S142, thereby extending the photographing lens by a quantity corresponding to the arithmetic result in step S126 or the distance measuring mode determined in step S124. In step S143, whether the step S2 flag is 1 is again determined. If the answer is YES, the program skips to step S150. Whereas if the answer is NO, the photometric processing flag is set to 1 in step S144, and the sequential photometric processing is carried out in step S145. Subsequently, whether half-pushed (S1=ON) or is determined in step S146. If the answer is YES, the program shifts to step S149. Whereas if the answer is NO, the program shifts to step S147.

In step S149, whether full-pushed (S2=ON) is determined. If the determination is affirmative, the program shifts to step S150. If negative, the program returns to step S145, in which the sequential photometric processing is repeated. On the other hand, the lens barrel driving device 22 returns the lens barrel to the initial position in step S147, and, thereafter, the sequential photometric processing flag is set to 1 in step S148. Then, the program goes back to step S105.

In step S150, the shutter driving device 20 is controlled based on the results of the AV and TV calculations effected in step S128 given above, thus exposing the film. At this time, if the electronic flash flag is 1, the electronic flash equipment 13 is also controlled to emit a flash. After finishing the exposure, the program moves to step S151, wherein the lens barrel is moved back to the initial position by the lens barrel driving device 22. In step S152, a film driving device 21 winds up the film for one frame. Thereafter, there is a wait until the half-push is canceled (S1=OFF) in step S153. Then, the program goes back to step S102 in which the operation resumes from the beginning.

Figure 7:
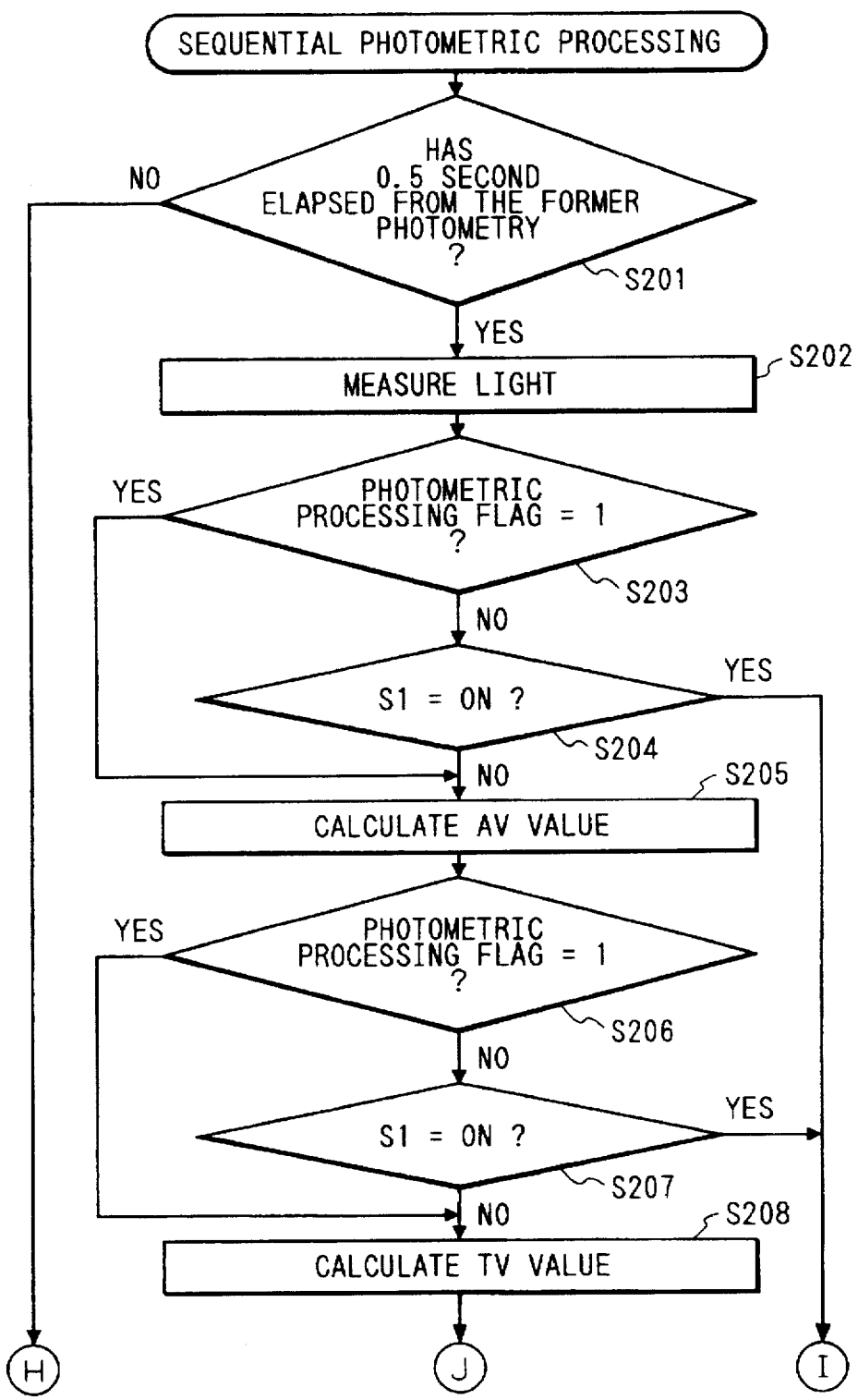
FIG. 7 is a flowchart of assistance in explaining sequential photometric processing of the camera in the embodiment of this invention.
Figure 8:
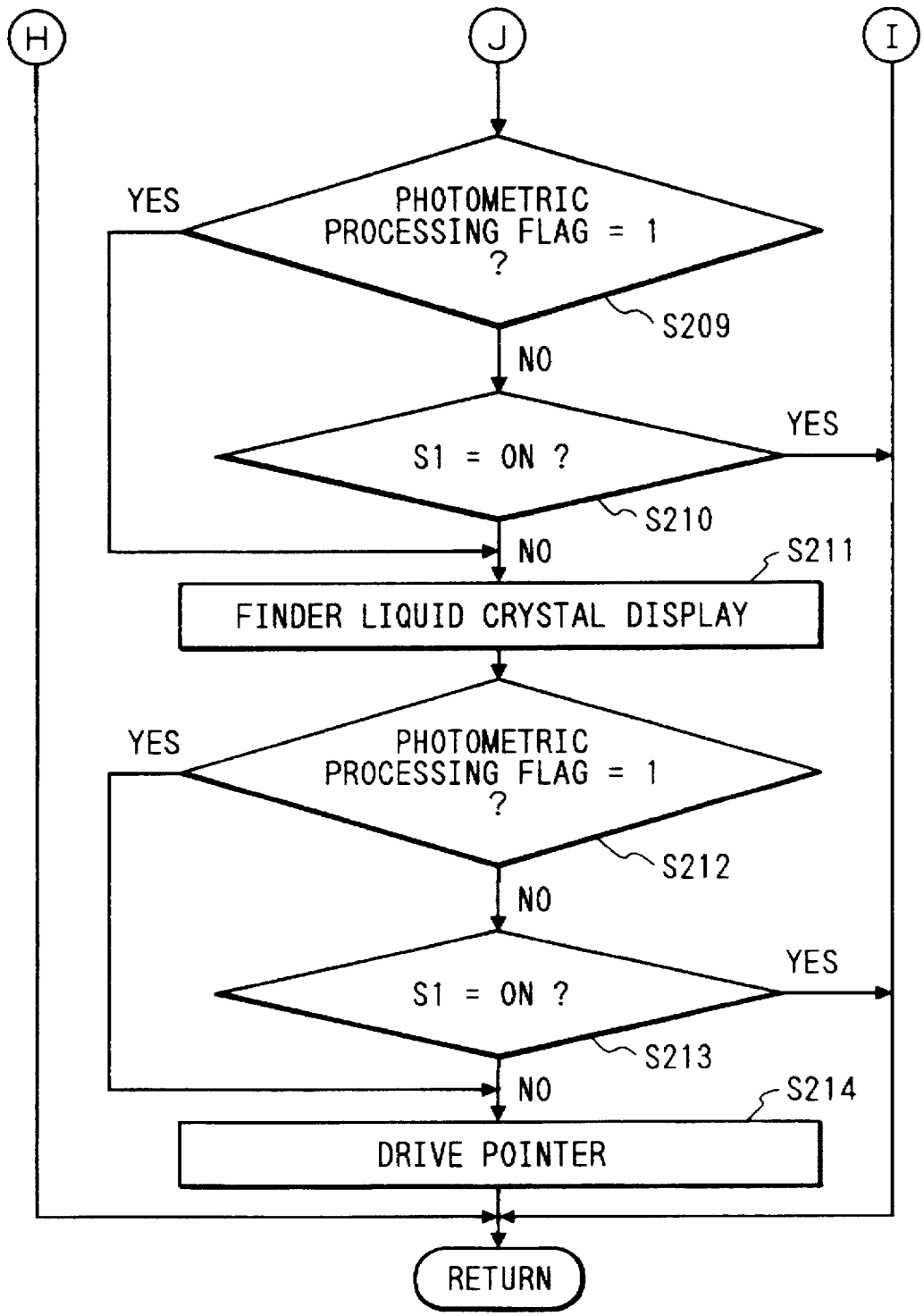
FIG. 8 is a flowchart continued from FIG. 7.

FIGS. 7 and 8 are flowcharts illustrating the details of the sequential photometric processing shown in steps S110 and S145.

To start with, whether 0.5 sec. has elapsed since the sequential photometric processing was performed last time is determined in step S201. If the answer is YES, the program moves to step S202. Whereas if the answer is NO, the sequential photometric processing is ended, and the program returns to the main routine.

In step S202, the photometric device 19 performs the photometric processing in the same way with step S127 of the main routine. Subsequently in step S203, whether the photometric processing is 1 is determined. As a result, if the photometric processing flag is not 1, the program goes to step S204 to determine whether half-pushed (S1=ON). If half-pushed, the sequential photometric processing is finished, and the program goes back to the main routine. Whereas if not half-pushed in step S204, or if the photometric processing flag is 1 in step S203, the program moves to step S205. Therein, the AV value is calculated based on the photometric result given in step S202.

Subsequently in step S206, whether the photometric processing flag is 1 is determined. If the photometric processing flag is not 1, the program moves to step S207 to determine whether half-pushed (S1=ON). If half-pushed, the sequential photometric processing comes to an end, and the program returns to the main routine. Whereas if not half-pushed in step S207, or if the photometric processing flag is 1 in step S206, the program goes to step S208. Therein, the TV value is calculated based on the photometric result given in step S202.

Subsequently in step S209 in FIG. 8, whether the photometric processing flag is 1 or not is determined. If the photometric processing flag is not 1, the program moves to step S210 to determine whether half-pushed (S1=ON). If half-pushed, the sequential photometric processing is finished, and the program returns to the main routine. Whereas if not half-pushed in step S210, or if the photometric processing flag is 1 in step S209, the program goes to step S211, wherein the results of the AV and TV calculations are displayed on the in-finder liquid crystal display device 16.

Determined subsequently in step S212 is whether or not the photometric processing flag is 1. If the photometric processing flag is not 1, the program moves to step S213 to determine whether half-pushed (S1=ON). If half-pushed, the sequential photometric processing is finished, and the program returns to the main routine. Whereas if not half-pushed in step S213, or if the photometric processing flag is 1 in step S212, the program goes to step S214, wherein the results of the AV and TV calculations are indicated by the pointer type indicator 25. Thereafter, the sequential photometric processing is ended, and the program returns to the main routine.

The actions discussed above will be itemized.

(1) Standby Action (First Photographing Standby Action)

After turning ON the power switch, the standby action starts with the half-push of the release button. First, the sequential photometric processing flag is cleared (S102), and, thereafter, the half-push timer is started (S103). Then, the charging of the electronic flash equipment 13 is started (S104). The program goes straight to step S108 until the charging of the electronic flash equipment 13 is finished. The sequential photometric processing flag, however, remains cleared at this point of time, and, hence, the program skips to step S111 without effecting the sequential photometric processing. Therein, whether half-pushed is determined. If half-pushed therein, the standby action is finished, and a second photographing standby action which will be mentioned later will be executed. Whereas if not half-pushed, the program goes back to step S105. The charging of the electronic flash equipment 13 is, when charged, stopped (S107). The actions of steps S105–S111 are to be repeatedly executed. Then, if the timer is terminated (YES in step S105) without being half-pushed within a predetermined time of the half-push timer, the operation of the camera is ended.

On the other hand, the standby action also starts in the case of canceling the half-push (NO in S140) when the photographing data are displayed on the in-finder liquid crystal display device 24 as well as being indicated by the pointer type indicator 25 in the second photographing standby action which will be hereinbelow stated. Similarly, the standby action also starts after temporarily returning the lens barrel (S147) in the case of canceling the half-push (NO in S146) when the lens barrel is driven by the lens barrel driving device 22 in the second photographing standby action which will be mentioned later. In any case, the sequential photometric processing flag is set to 1 (S141, S148), and, hence, the determination in step S108 is affirmative, with the result that the sequential photometric processing is executed (S111). The half-push does not, however, continue, and, therefore, the photometric processing flag is cleared in step S109.

The photometric action takes place at intervals of 0.5 sec. in the sequential photometric processing in step S111, and the photometric calculation and the display action are executed (S202, S205, S208, S211 and S214). On this occasion, the photometric processing flag is cleared, and, for this reason, steps S203, S206, S209 and S212 are all denied. If half-pushed during an execution timing of each of the actions described above, the actions subsequent thereto are omitted, and the program immediately returns to the main routine. Thereafter, if the half-push continues, the operation shifts to the second photographing standby action.

(2) Second Photographing Standby Action

If half-pushed during the execution of the standby action, the second photographing standby action is to be executed (YES in S111). At the first onset, there is a wait for a predetermined time so as not to undergo chattering of the release switch (S113), and, thereafter, a battery voltage is checked (S116). If the battery voltage is insufficient, the cancellation of the half-push is awaited, and the action is stopped. Whereas if sufficient, the photometric circuit of the photometric device 19 is powered ON (S119). The DX code on the film patrone is read (S120), and, at the same time, there are read a variety of items such as an exposure compensating value, a panorama switching state, an electronic flash mode, etc. (S121–S123). Further, the distance measuring processing is effected based on the distance measuring mode (S124–S126), and the arithmetic processing is performed by measuring the luminance of the object (S127, S128).

Subsequently, if the charging of the electronic flash equipment 13 is not yet completed (NO in S130) although it is determined from the result of the photometric calculation that the flashing of the electronic flash equipment 13 is needed, the program returns to the standby action (S131–S136), awaiting the charging of the electronic flash equipment 13.

When the charging of the electronic flash equipment 13 is completed, or if there is no necessity for the flashing of the electronic flash equipment 13, the indication or non-indication of the photographing data by the liquid crystal display device 24 or the pointer type indicator 25 is determined, depending on whether or not the full-push is conducted (S137–S140). Moreover, if the half-push is canceled (NO in S140) just when the photographing data are displayed, the program goes back to the standby action.

If the half-push continues, or if the full-push is conducted, the lens barrel is driven by the lens barrel driving device 22 (S142). If the full-push further continues, the photographing action which will be stated later is executed (YES in S143). While on the other hand, if the half-push continues, 1 is substituted into the photometric processing flag (S144) so as not to omit the display action in the sequential photometric processing, and the sequential photometric processing is executed (S145). Whether the half-push continues is determined also when finishing the sequential photometric processing. If the half-push is canceled, the program returns to the standby action (NO in S146). So far as the half-push continues but the full-push is not effected, the sequential photometric processing is repeatedly executed (YES in S146 but NO in S149). Then, the photographing action is executed just when the full-push is performed.

(3) Photographing Action

When the full-push takes place, the shutter driving device 7 exposes the film (S150). Further, the lens barrel is moved back to the initial position (S151), and the film driving device 8 winds up the film for one frame (S152). Thereafter, the program returns to the standby action, waiting the cancellation of the half-push (NO in S153).

Accordingly, in accordance with this embodiment, the execution or non-execution of the half-push is determined between the respective actions in the sequential photometric processing that serve as a part of the standby actions. When determining that the half-push is performed, the subsequent actions in the sequential photometric processing are omitted, thereby shifting to the second photographing standby action. Hence, a time lag of shifting to the second photographing standby action can be made shorter as well as making the response quicker than in the conventional case where the shift to the second photographing standby action can not be allowed unless the standby action is finished once. Especially in this embodiment, the sequential photometric processing includes the display action by the late-of-response pointer type indicator 25, and, hence, there increases such a merit that the immediate shift to the second photographing standby action can be attained by omitting this display action.

Relating the elements in the embodiments discussed above to those in the following claims, controlled elements correspond to the electronic flash equipment 13, the shutter driving device 20, the film driving device 21, the lens barrel driving 22, the pointer type indicator 25 and the in-finder liquid crystal display device 24. The release switch 11 corresponds to a release element, and the CPU 10 corresponds to a controlling element.

Note that the camera according to the present invention is not confined in terms of its details to one embodiment discussed above but may take a variety of modifications.

As fully discussed above, according to the present invention, when determining that the first signal is outputted between the first action and the second action of the first photographing standby action, the operation shifts to the second photographing standby action by omitting the respective steps of the second action. The time lag of shifting to the second photographing standby action can be made shorter as well as making the response quicker than in the case where the shift to the second photographing standby action can not be allowed unless the first photographing standby action is finished once as in the prior art.

It is apparent that, in this invention, a wide range of different working modes can be formed based on the invention without deviating from the spirit and scope of the invention. This invention is not restricted by its specific working modes except being limited by the appended claims.

What is claimed is:

1. A camera comprising:
   a plurality of controlled devices, each operated in at least one of a photographing action and a photographing standby action, the photographing standby action having a first photographing standby action and a second photographing standby action;
   a release device having a first stroke of outputting a first signal to indicate an execution of the photographing standby action and a second stroke of outputting a second signal to indicate an execution of the photographing action; and
   a controlling device to repeatedly execute a part of the second photographing standby action through a part of said controlled devices during the outputting of the first signal, to repeatedly execute the first photographing action until a predetermined time elapses or until the first signal is outputted when the first signal annihilates without outputting the second signal after the first signal has been outputted, to start an execution of the second photographing standby action when the first signal is outputted during the execution of the first photographing standby action and executing the photographing action by another part of said controlled devices when the second signal is outputted after executing at least another part of the second photographing standby action,
   wherein the first photographing standby action contains at least a first action and a second action executed in sequence and also a determining action of determining whether the first signal is outputted from said release device, and
   said controlling device determines whether or not the first signal is outputted from said release device between the first action and the second action and starts, when determining that the first signal is outputted, the second photographing standby action by skipping over the second action.

2. A camera according to claim 1, wherein the second action contains such an action that an indicator indicates data by mechanically driving a pointer thereof.

3. A camera comprising:
   a release device having a first stroke of outputting a first signal to indicate an execution of a photographing standby action and a second stroke of outputting a second signal to indicate an execution of a photographing action;

a measuring device to measure photographing data;

a display device to display the photographing data measured by said measuring device, the photographing standby action having a first photographing standby action and a second photographing standby action, the first photographing standby action having a sequential action to repeatedly execute a series of actions, the series of actions containing a measuring action of the photographing data by said measuring device, a determining action of determining whether the first signal is outputted, a displaying action of displaying the photographing data and a determining action of determining whether the first signal is outputted, said actions being executed in sequence;

a timer to start measuring a predetermined time when receiving the first signal for the first time, a controlling device to execute the second photographing standby action without executing the sequential actions of the first standby action when the first signal is outputted for the first time, to execute the sequential actions of the first photographing standby action until a predetermined time of said time elapses or until the next first signal is outputted when the first signal annihilates without receiving the second signal, to execute the second standby action without executing the display action when receiving the first signal during the execution of the sequential actions and to execute the photographing action after the second standby action when photographing action after the second standby action when receiving the second signal.

4. A method of controlling a camera, comprising the steps of:

repeatedly executing a part of a second photographing standby action through a part of a plurality of controlled devices while causing a release device to output a first signal to indicate an execution of a photographing standby action which includes a first photographing standby action and said second photographing standby action;

repeatedly executing said first photographing standby action until a predetermined time elapses or until the first signal is output when the first signal annihilates without the release device outputting a second signal to indicate an execution of a photographing action after the first signal has been output, wherein the first photographing standby action contains at least a first action and a second action executed in sequence and also a determining action of determining whether the first signal is output from said release device;

starting an execution of the second photographing standby action when the first signal is output during the execution of the first photographing standby action;

executing the photographing action by another part of said controlled devices when the second signal is output after executing at least another part of the second photographing standby action; and determining whether the first signal is output from said release device between the first action and the second action and starting, when determining that the first signal is output, the second photographing standby action by skipping over the second action.

5. A method of controlling a camera, comprising the steps of:

executing a second photographing standby action without executing sequential actions of a first photographing standby action when a first signal to indicate an execution of a photographing standby action is output by a release device for the first time, wherein the photographing standby action has the first photographing standby action and the second photographing standby action, and wherein the first photographing standby action has a sequential action for repeatedly executing a series of actions, and wherein the series of actions contain a measuring action of photographing data by a measuring device, a determining action of determining whether the first signal is output, a displaying action of displaying the photographing data and a determining action of determining whether the first signal is output, said actions being sequentially executed;

executing the sequential actions of the first photographing standby action until a predetermined time elapses or until the next first signal is output when the first signal annihilates without said release device outputting a second signal to indicate an execution of a photographing action;

executing the second photographing standby action without executing the display action when said release device outputs the first signal during the execution of said sequential actions; and executing the photographing action after the second photographing standby action when said release device outputs said second signal.

6. A method of controlling a camera comprising:

starting execution of a second photographing standby action when a first signal is output during execution of a first photographing standby action; and determining whether the first signal is output from a release device between a first action and a second action and starting, when determining that the first signal is output, the second photographing standby action by skipping over the second action.

* * * * *